C. R. UEBELMESSER.
DEVICE FOR REPAIRING MOVING PICTURE FILMS.
APPLICATION FILED OCT. 4, 1907.
913,326.
Patented Feb. 23, 1909.
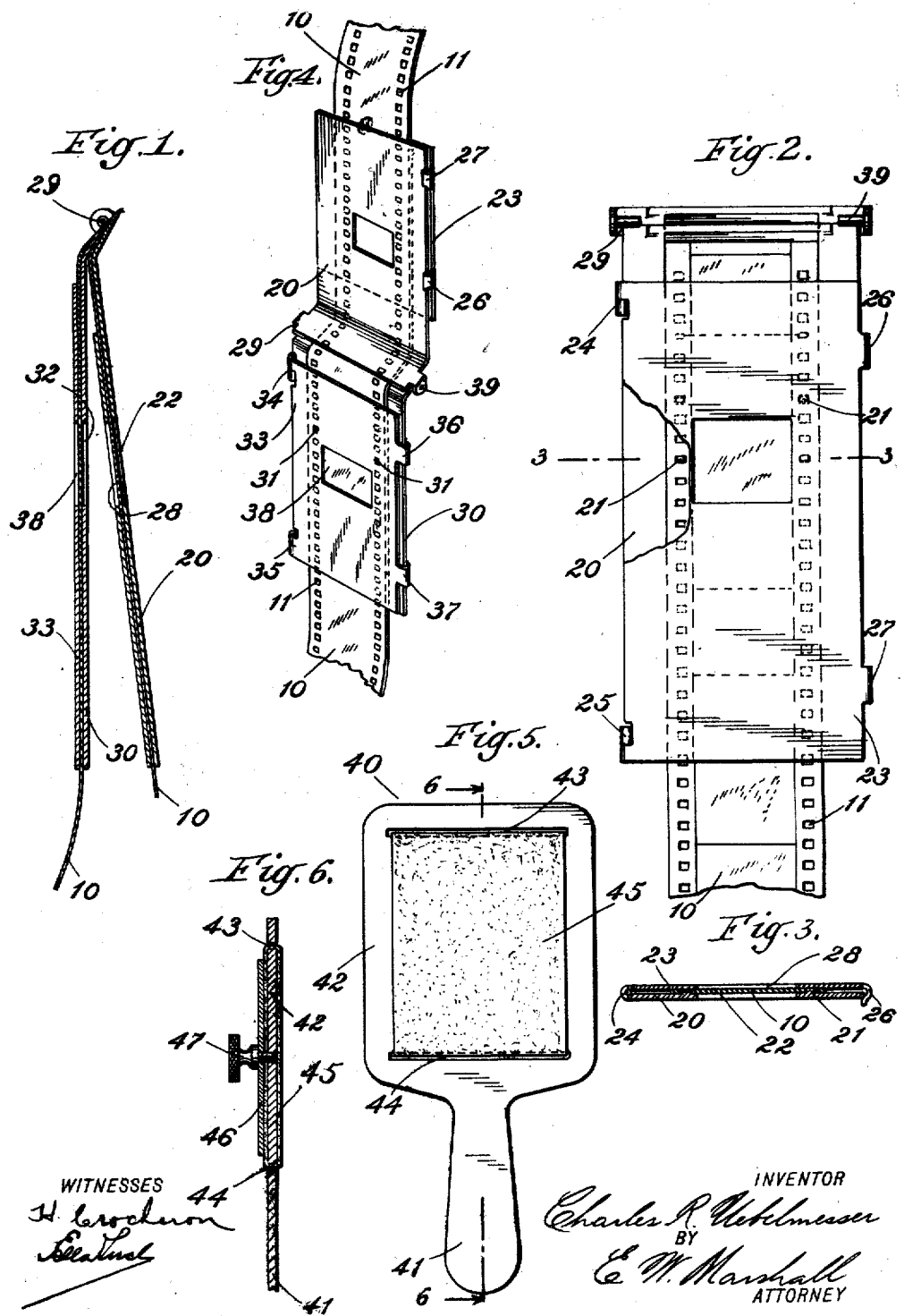
WITNESSES
INVENTOR
Charles R. Uebelmesser
BY
E. W. Marshall
ATTORNEY

UNITED STATES PATENT OFFICE.

CHARLES R. UEBELMESSER, OF NEW YORK, N. Y.

DEVICE FOR REPAIRING MOVING-PICTURE FILMS.

No. 913,326.   Specification of Letters Patent.   Patented Feb. 23, 1909.

Application filed October 4, 1907. Serial No. 395,842.

*To all whom it may concern:*

Be it known that I, CHARLES R. UEBEL-MESSER, a subject of the Emperor of Germany, and a resident of the city of New York, in the county of New York and State of New York, United States of America, have invented certain new and useful Improvements in Devices for Repairing Moving-Picture Films, of which the following is a specification.

My invention relates to a device for holding the ends of films such as are used in moving picture machines, preparing such ends for joining them and pressing them together while they are being cemented. Such films are often of great length and are sometimes torn and ruined. By my invention such damage may be quickly and easily repaired. The device which I have invented may also be used to fasten two or more films together to form a continuous strip, or to secure the opposite ends of a film together into an endless loop.

I will describe my invention in the following specification and point out the novel features thereof in claims.

Referring to the drawings, Figure 1 is a sectional side elevation of my device with a film in place, the parts being shown in the position for preparing the ends of the film which are to be joined. Fig. 2 is a front elevation, partly broken away, of some of the parts of the apparatus shown in Fig. 1. Fig. 3 is a sectional plan view of the parts shown in Fig. 2, the section being taken through the line 3—3 of Fig. 2. Fig. 4 is a perspective view of my device showing the parts in their closed or cemented position. Fig. 5 is a front elevation of a tool which I use in connection with this invention, and which has been made the subject of another application for Letters Patent Serial Number 409,357, filed January 4th, 1907. Fig. 6 is a sectional side elevation of this tool, the section being taken through the line 6—6 of Fig. 5.

Like characters of reference designate corresponding parts in all of the figures.

10 designates a film of the kind used in moving picture machines and on which are a plurality of pictures of successive poses.

11, 11 are holes along the sides of the film with which a part of the machine engages to drive the film.

20 is a flat holding member from which project several teeth 21 which fit into some of the holes 11 in a film when the latter is placed thereon.

22 designates an aperture which is provided in the member 20 and which is of approximately the size and shape of one of the pictures on a film. A clamping piece 23 is pivoted at 24 and 25 to one edge of the member 20, and is provided at 26 and 27 with spring catches which engage with the opposite edge of the part 20 to hold the clamping piece down over the holding member 20. An aperture 28 which registers with the aperture 22 is provided in this clamping piece. 30 designates another flat holding member similarly constructed and provided with teeth 31 and an aperture 32.

33 is a clamping piece pivoted at 34 and 35 to the member 30 and arranged to be held thereon by spring catches 36 and 37. 38 is an aperture in this clamping piece. One end of each of these holding members is preferably bent at an angle as shown, and the two members are pivotally joined together at 29, 39.

40 designates a smoothing tool which I have designed for use in conjunction with the above described device. It comprises a handle 41 depending from a flat frame 42 in which is a pair of parallel slots 43, 44. A piece of sandpaper 45 may be passed through these slots, and after it has been drawn tight its ends may be fastened by a clamp 46 drawn down against them by a thumb-screw 47.

The manner of using this apparatus is as follows: The films to be joined are placed upon the two holding members 20 and 30 with their faces oppositely disposed; that is, if the front face of one of the films is placed upon the holding member 20, the back face of the other film should be placed upon the holding member 30 and vice versa. These films should be so placed upon the holding members as to cause one of the series of pictures upon each of the films to register with the aperture in its respective holding member, and then held in place thereon by passing the teeth 21 and 31 through some of the holes 11, 11 in the films. These apertures and teeth in the two holding members are a definite distance apart for a purpose which will appear hereinafter.

In order to hold the films more securely against the holding members, clamping pieces such as 23, 33 may be provided if desired. These are opened and swung backon their pivots when the films are first placed in position upon the holding members. They are then closed down upon the holding members thereby positively securing the films in place. The two holding members are then swung into open position, which is the position shown in Fig. 1. The upper edges of the two pieces of film will then project slightly above the upper edges of the holding members. If the film had been torn these edges might be irregular, and if desired may be trimmed off roughly with a knife or scissors. While the parts are thus held in the relative positions just described, a file or the smoothing tool is used to finish the edges of the films and to provide them with a suitable bevel. In order to facilitate this part of the operation pivoted joints 29, 39 may be used to guide the smoothing tool. After the ends of the films have thus been suitably prepared, cement is applied to them and the two holding members with their respective films held thereon are swung about their pivoted joints into closed or sealing position, as is shown in Fig. 4. The parts are so proportioned and arranged that the beveled ends of the films are brought into juxtaposition by this operation and may be held together until the cement is set when a smooth and strong joint will have been formed. It will now appear that the relative positions of the films 21 and 31 and the apertures 22 and 32 of the two holding members is important.
This is because the various pictures of the series on any one film are a fixed distance apart and by this apparatus this fixed distance between different poses is maintained, although in the process one or more of the poses of the series is eliminated.

I have shown a simple form of my invention, as only a simple apparatus like that described is necessary for carrying it out and for quickly and effectively joining the ends of films together.

What I claim is,—

1. In a device of the character described, the combination of a pair of holding members, each arranged to hold a piece of film in a predetermined relative position, and means for turning one of said films over to bring its end against the end of the other film to effect a joint between them.

2. In a device of the character described, the combination of a pair of holding members, pivotally connected together and arranged to hold two pieces of films at a definite longitudinal distance apart.

3. In a device of the character described, the combination of a pair of holding members, means for positively securing a piece of film to each of said members at a predetermined relative position so that the end of each piece of film may be beveled at the same time, and means for turning one of said films over to bring its beveled end against the beveled end of the other film to effect a joint between them.

4. In a device of the character described, the combination of a pair of holding members, teeth upon said holding members arranged to take into parts of films and thereby positively securing a piece of film to each of said holding members at a predetermined relative position, said holding members being provided with apertures for registering the films, and means for bringing the ends of said films together to effect a cemented joint between them.

5. In a device of the character described, the combination of a pair of holding members pivotally connected together, teeth upon said holding members arranged to take into parts of films, clamping pieces arranged to hold said film upon the holding members and over said teeth, thereby positively securing a piece of film to each of said holding members at a predetermined relative position, said members being arranged to hold the ends of the films together so that the ends of both may be trimmed and beveled together, and means for bringing the beveled ends of said films together to effect a cemented joint between them.

6. In a device of the character described, the combination of a pair of holding members pivotally connected together, teeth upon said holding members arranged to take into parts of films, clamping pieces arranged to hold said film upon the holding members, and over said teeth, thereby positively securing a piece of film to each of said holding members at a predetermined relative position, said holding members and clamping pieces being provided with apertures for registering the films, said members being arranged to hold the ends of the films together so that the ends of both may be trimmed and beveled together, and means for bringing the beveled ends of said films together to effect a cemented joint between them.

In testimony whereof I have signed my name to this specification in the presence of two subscribing witnesses.

CHARLES R. UEBELMESSER.

Witnesses:
ELLA TUCH,
ERNEST W. MARSHALL.